United States Patent
McBain (10) Patent No.: US 11,053,002 B2
(45) Date of Patent: *Jul. 6, 2021

(54) GEAR-DRIVEN AXIAL MODULATING MECHANISM FOR ROTATING SHAFTS REALIZING A CONTROLLABLE PITCH PROPELLER/FAN

(71) Applicant: Jordan James McBain, Commerce Township, MI (US)

(72) Inventor: Jordan James McBain, Commerce Township, MI (US)

(73) Assignee: Cool Mechatronics, Commerce Township, MI (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/397,858

(22) Filed: Apr. 29, 2019

(65) Prior Publication Data

US 2019/0256206 A1 Aug. 22, 2019

Related U.S. Application Data

(63) Continuation-in-part of application No. 15/424,831, filed on Feb. 4, 2017, now Pat. No. 10,443,413.

(51) Int. Cl.
B64C 27/59 (2006.01)
B64C 11/32 (2006.01)
B64C 11/06 (2006.01)

(52) U.S. Cl.
CPC .............. *B64C 27/59* (2013.01); *B64C 11/06* (2013.01); *B64C 11/32* (2013.01)

(58) Field of Classification Search
CPC ......... B64C 27/59; B64C 11/06; B64C 11/32; B63H 3/04; F04D 29/362; F05D 2260/4031; F05D 2260/76
See application file for complete search history.

(56) References Cited

U.S. PATENT DOCUMENTS

| | | | | |
|---|---|---|---|---|
| 5,685,694 A * | 11/1997 | Jones | ..................... | F03D 7/0224 416/147 |
| 6,065,933 A * | 5/2000 | Secord | ..................... | B63H 1/22 416/142 |
| 8,167,553 B2 * | 5/2012 | Perkinson | ............... | B64C 11/44 416/1 |
| 8,870,539 B2 * | 10/2014 | Hallstrom | ............. | F03D 7/0224 416/165 |
| 2008/0095627 A1 * | 4/2008 | Castillo | ................. | F04D 29/362 416/147 |

(Continued)

*Primary Examiner* — Daniel J Colilla (57) ABSTRACT

This invention employs a generic axial modulating mechanism to manipulate the pitch of the blades of a fan or propeller; conceptually, this is a threaded bolt and nut where the threaded bolt would be analogous to a rotating shaft, with an acme thread (i.e. the "rotor thread") on its exterior, and the nut would be analogous to the axial modulator of this teaching. The "nut," or axial modulator, is further spun above and beyond the rotation in the rotating bolt or rotating shaft. The axial motion of the axial modulator is then deployed to do useful work i.e. manipulate the pitch of the blades of a fan or propeller. This invention is a continuation in part of a previous variant disclosed where the means of modulating the axial modulator was magnetic. The variation introduced in this teaching instead achieves the modulation using a gear-driven arrangement.

12 Claims, 6 Drawing Sheets

(56) References Cited

U.S. PATENT DOCUMENTS

2011/0293426 A1* 12/2011 Fucks .................. F04D 29/323
                                                                    416/147
2018/0171973 A1    6/2018 McBain

* cited by examiner

GEAR-DRIVEN AXIAL MODULATING MECHANISM FOR ROTATING SHAFTS REALIZING A CONTROLLABLE PITCH PROPELLER/FAN

CROSS-REFERENCE TO RELATED APPLICATIONS

This application is a continuation-in-part of U.S. application Ser. No. 15/424,831 filed 4 Feb. 2017 by Jordan McBain and entitled "An Axial Modulating Mechanism for Rotating Shafts Realizing Controllable-Pitch Blade Fans," the entire disclosure of which is incorporated herein by reference.

BACKGROUND OF THE INVENTION

1. Field of the Invention

An apparatus to cause axial modulation of an actuator on a rotating shaft used to realize a controllable-pitch-blade fan.

2. Description of the Prior Art

The generic notion of an axial modulating mechanism is first introduced; conceptually, this is a threaded bolt and nut where the threaded bolt would be analogous to a rotating shaft (22), with an acme thread (i.e. the "rotor thread" (24)) on its exterior, and the nut would be analogous to the axial modulator (32) of this teaching. The "nut," or axial modulator (32), is further spun above and beyond the rotation in the rotating bolt or rotating shaft. The axial motion of the axial modulator (32) is then deployed to do useful work.

The rotating shaft (22) is rotatably mounted in a stator system (20) on which a rotor thread (24), consisting of a helical groove, is affixed. An axial modulator (32) with a helical groove capable of mating threadedly to the rotor thread (24) is also employed. This rotating shaft (22), or rotor system, is normally rigidly connected to and driven by a prime mover (normally a motor or thermal engine); it is constituted and capable of imparting a torque on the rotor system (22) in order to cause the rotor system to rotate.

The axial modulator (32) is then deployed on a fan, propeller or turbine. This fan has a blade hub (26) that is rigidly affixed to the prime mover. The blade hub (26) hosts a plurality of blades that are in turn used to transfer mechanical energy between the rotating shaft (22) and a fluid in which one or more of the blades are immersed. One or more of these blades are controllable-pitch blades (28) that are free to rotate within the blade hub (26).

In the case of a turbine or turbo fan, a prime mover might not be employed to cause the rotor system to rotate; instead, the rotor system is spun by motion of mechanical energy in the fluid in which the plurality of blades is immersed.

SUMMARY OF THE INVENTION

The novelty of this invention lies in the unique combination of the prior art of the rotor thread (24) applied to the rotating shaft or "rotor system" (22), the axial modulator (32), having a thread on an interior cylindrical cavity, threadedly mated to the rotor thread (24) on a rotating shaft (22), and the means of causing the axial modulator (32) to be spun above and beyond the rotation of the rotating shaft (22) through an axial modulating mechanism [(37),(39)]. The axial modulating mechanism [(37),(39)] is affixed to the stator system and is constituted to apply a torque to the axial modulator (32) to cause the axial modulator (32) to rotate above and beyond the rotations of the rotating shaft (22), to which it is threadedly mated; the resultant axial displacement of the axial modulator (32) is then used to do useful work.

In this continuation-in-part application, the axial modulating mechanism [(37),(39)] is driven by a spur-gear arrangement. The axial modulator (32) has a cylindrical exterior, concentric with its cylindrical cavity in which its mating rotor thread (24) is affixed, whereupon a spur-gear profile is affixed. This spur-gear profile is then meshed with an axial-modulating pinion (39) formed by a pinion gear having a spur-gear profile capable of meshing with the spur-gear profile of the axial modulator (32). The axial modulating mechanism [(37),(39)] further has an axial-modulating prime mover (37) that is rigidly connected to the axial-modulating pinion (39). The axial-modulating prime mover (37) is constituted to and capable of imparting a torque on the axial-modulating pinion (39) in order to cause it to rotate. The axial modulating mechanism [(37),(39)] is juxtaposed to the axial modulator (32) in order to allow the spur-gear profile of the axial-modulating pinion (39) to mesh rotatably with the spur-gear profile of the axial modulator (32).

Since, the axial modulator (32) will move backwards and forwards along an axis of the rotor system (22), the axial-modulating pinion (39) is configured to have a height sufficient to allow the axial-modulating pinion (39) to remain in mesh with the axial modulator (32) while the axial modulator (32) moves backwards and forwards axially while it is threadedly constrained within the rotor thread (24).

The threaded interaction between the rotor thread (24) and the axial modulator (32) might consist of a ball-screw arrangement instead of an acme thread. Alternatively, the threaded interaction between the rotor thread (24) the axial modulator (32) might consist of a roller-screw arrangement.

Each axial modulator (32) and axial-modulating pinion (39) have tangential rotational velocities measured on circles concentric with each respective spur-gear profile where the spur-gear profiles mesh. The invention employs a method of controlling the axial displacement of the axial modulator (32) including controlling the torque applied by the axial-modulating prime mover (37) on the axial-modulating pinion (39) in order to modulate the tangential speed of the axial-modulating pinion (39). A first step includes causing the tangential rotational speed of the axial-modulating pinion (39) to be equal in magnitude but opposite in direction to the tangential speed of the axial modulator (32) in order to cause the axial modulator (32) to be axially stationary to the rotor system (22) in which it is threadedly mated. A second step includes causing the tangential rotational speed of the axial-modulating pinion (39) to be greater in magnitude and opposite in direction to the tangential speed of the axial modulator (32) in order to cause the axial modulator (32) to accelerate axially along the rotor system (22) in which it is threadedly mated. A fourth step includes causing the tangential rotational speed of the axial-modulating pinion (39) to be lesser in magnitude and opposite in direction to the tangential speed of the axial modulator (32) in order to cause the axial modulator (32) to accelerate axially along the rotor system (22) in which it is threadedly mated. A sequence of combinations of these steps might be varied in the order in which they are executed in order to achieve control of the axial displacement of the axial modulator (32).

In the case of the axial modulating mechanism being applied to the manipulation of controllable-pitch blades (28), these steps will provide a method of controlling the pitch of the controllable-pitch blades (28).

Advantages of the Invention

The invention in its broadest aspect provides for a gear-driven axial modulating mechanism for rotating shafts realizing a controllable-pitch-blade fan.

BRIEF DESCRIPTION OF THE DRAWINGS

Referring to the Figures, wherein like numerals indicate corresponding parts throughout the several views, an apparatus for an axial modulating mechanism for rotating shafts is described.

FIG. 8a is a perspective view of the bottom of the blade hub (26) and 8b is a perspective view of the blade hub (26).

DESCRIPTION OF THE ENABLING EMBODIMENT

The combinations of the prior art and the inventive aspects of these teachings are employed to define an apparatus to manipulate controllable-pitch blades (28). The rotating shaft (22) is rotatably mounted in the stator system and is rigidly connected to a blade hub (26) that hosts a plurality of fan blades. The rotating shaft (22) is rigidly connected to a prime mover (21) to cause rotation in the rotating shaft (22) in order to impart mechanical energy onto a fluid in which the plurality of fan blades is immersed.

Alternatively, in the case of a turbo, the rotor system has no prime mover (21) and the fan blades are employed to transfer mechanical energy from the fluid in which the blades are immersed onto the rotor system (22).

A rotor thread (24), consisting of a helical groove, is affixed on the exterior surface of the rotating shaft (22). A mating thread is applied to an interior cylindrical cavity of an axial modulator (32) and that axial modulator (32) is then threadedly mated to the rotor thread (24) on the rotating shaft (22).

The blade hub (26) is constituted and disposed to allow the axial modulator (32) to move backwards and forwards within the hub. While the rotor thread (24) is disposed on the rotating shaft (22) to allow the axial modulator (32) to pass within the blade hub (26).

One or more of the plurality of blades affixed in the blade hub (26) is a controllable-pitch blade (28) with a rotatable base that is rotatably mounted in the blade hub (26). The controllable-pitch blades (28) are configured to interact with the axial modulator (32) such that the axial modulator's (32) motion through the blade hub (26) causes the controllable-pitch blades (28) to rotate within the hub. Consequently the blade hub (26) is configured to allow the axial modulator (32) to interface with the controllable-pitch blades (28) such that the axial modulator's (32) motion through the blade hub (26) causes the controllable-pitch blades (28) to rotate within said blade hub (26) by interacting with a blade pitch manipulator (54) mounted on the base of the controllable-pitch blades (28).

The axial modulator (32) has a cylindrical exterior concentric with the cylindrical cavity on which the helical groove of the axial modulator (32) is affixed. A spur-gear profile is affixed on this cylindrical exterior. In tandem, the axial modulating mechanism [(37),(39)] consequently consists of an axial-modulating pinion (39) formed by a pinion gear having a spur-gear profile that is capable of meshing with the axial modulator's (32) spur-gear profile. The axial-modulating pinion (39) is driven by axial-modulating prime mover (37) that is rigidly connected to the axial-modulating pinion (39) to impart a torque on the axial-modulating pinion (39) to cause it to rotate. The axial modulating mechanism [(37),(39)] is juxtaposed to the axial modulator (32) in order to allow the respective spur-gear profiles to mesh. The axial-modulating pinion (39) has a height, measured at right angles to its spur-gear profile, sufficient to allow the axial-modulating pinion (39) to remain in mesh with the axial modulator (32) while the axial modulator (32) moves backwards and forwards axially as it is threadedly constrained within the rotor thread (24).

Figure 1:
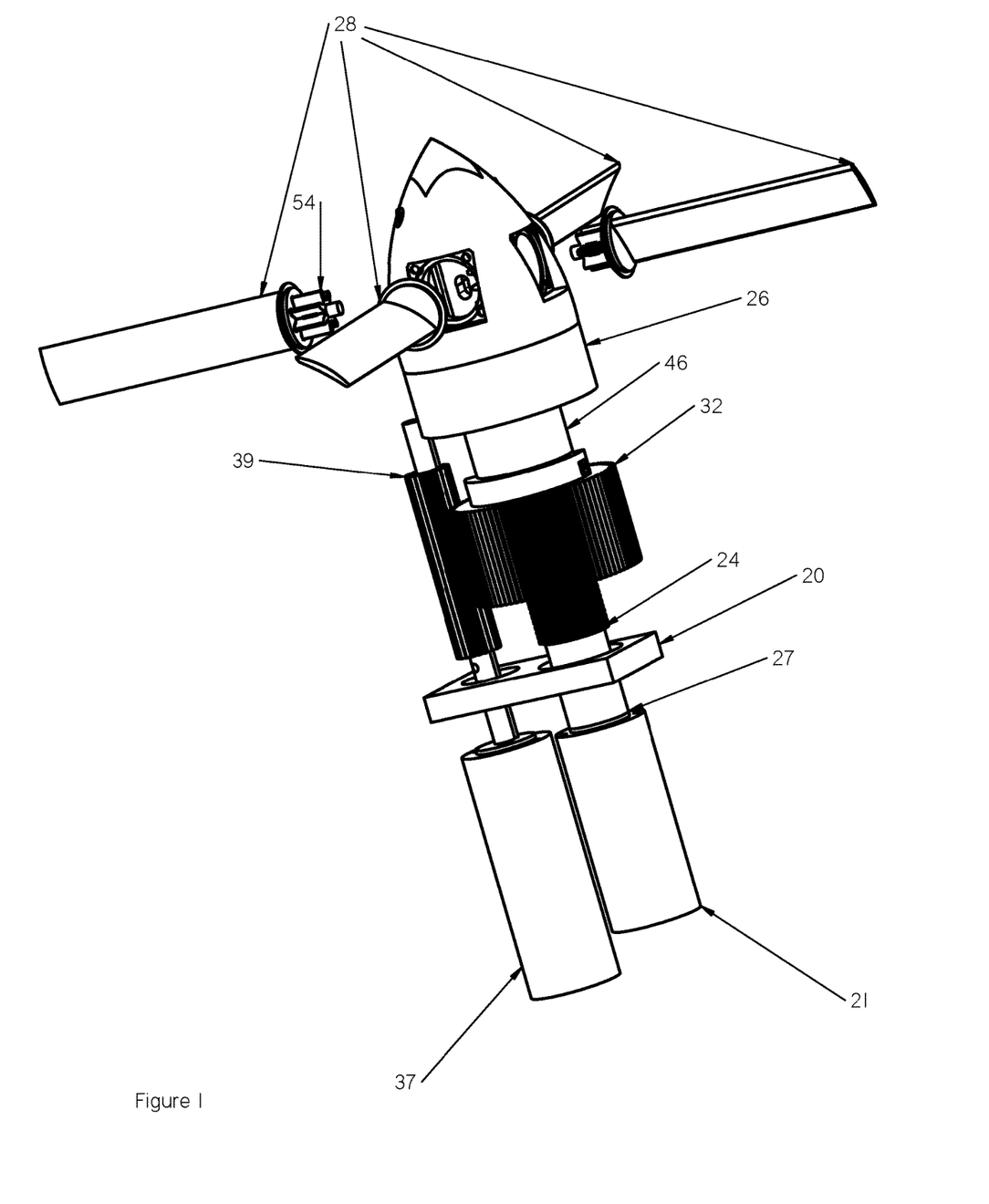
FIG. 1 is a perspective view of the gear-driven axial modulating mechanism as applied to a controllable-pitch blade fan/propeller.
Figure 2:
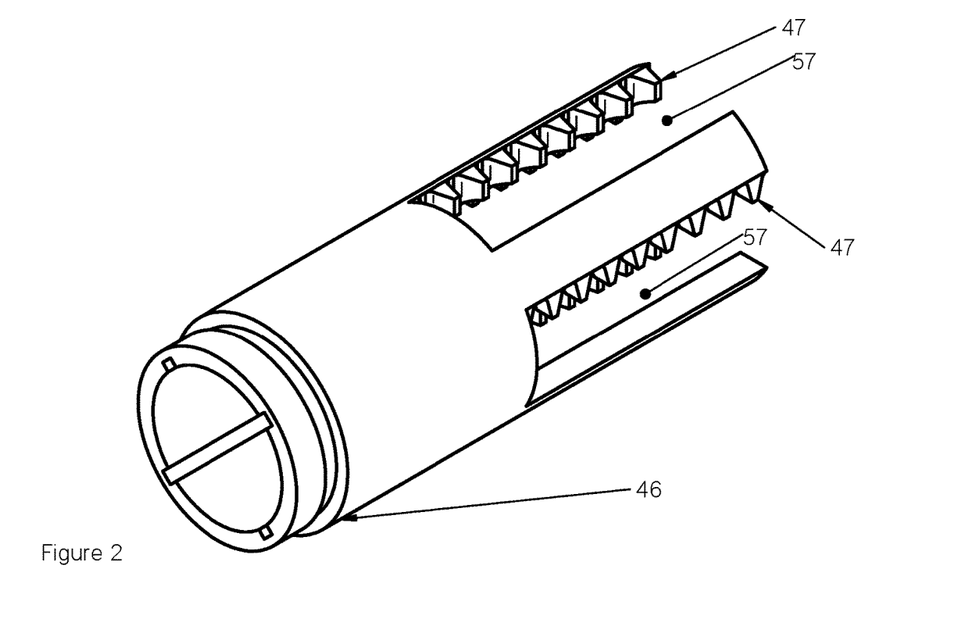
FIG. 2 is a perspective view of the pitch manipulator (46).
Figure 3:
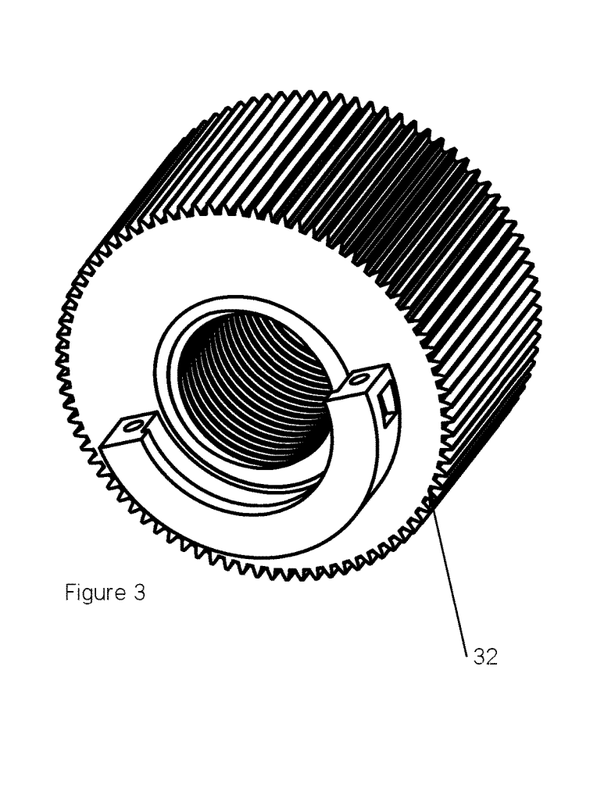
FIG. 3 is a perspective view of the axial modulator (32).
Figure 4:
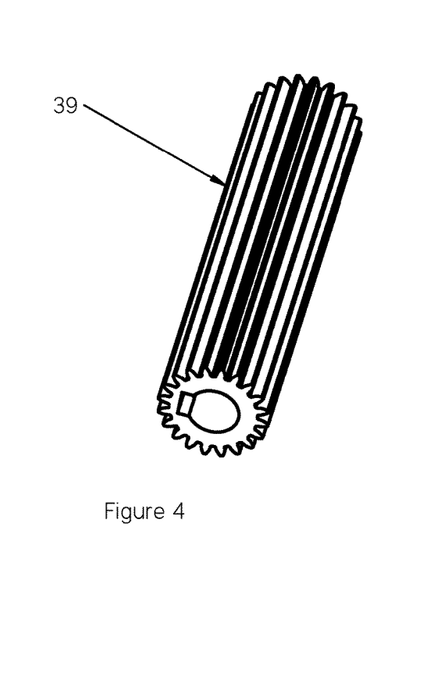
FIG. 4 is a perspective view of the axial-modulating pinion (39).
Figure 5:
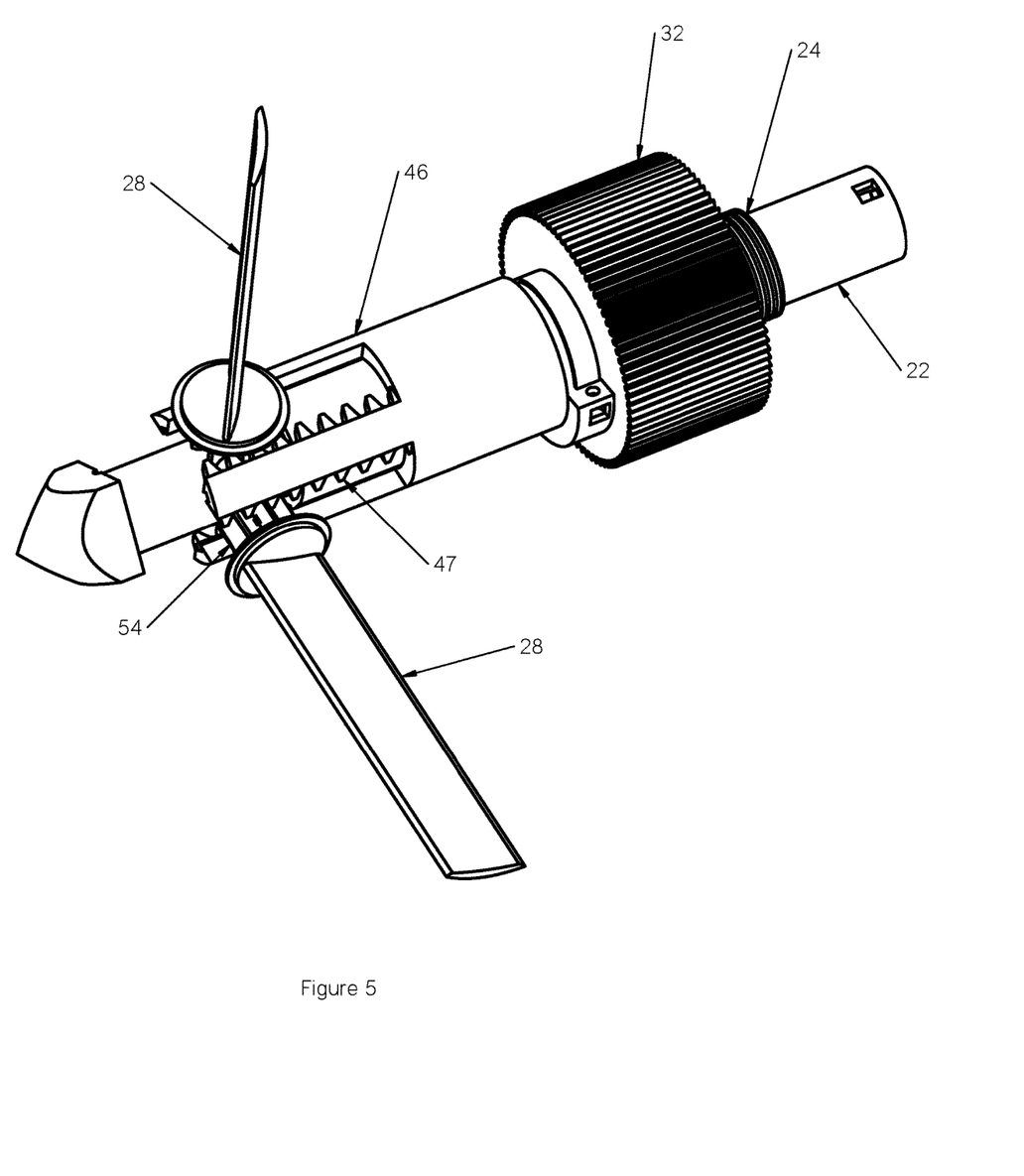
FIG. 5 is a perspective view of a partial assembly containing the controllable-pitch blades (28), rotating shaft (22), rotor thread (24), pitch manipulator (46), and axial modulator (32).
Figure 6:
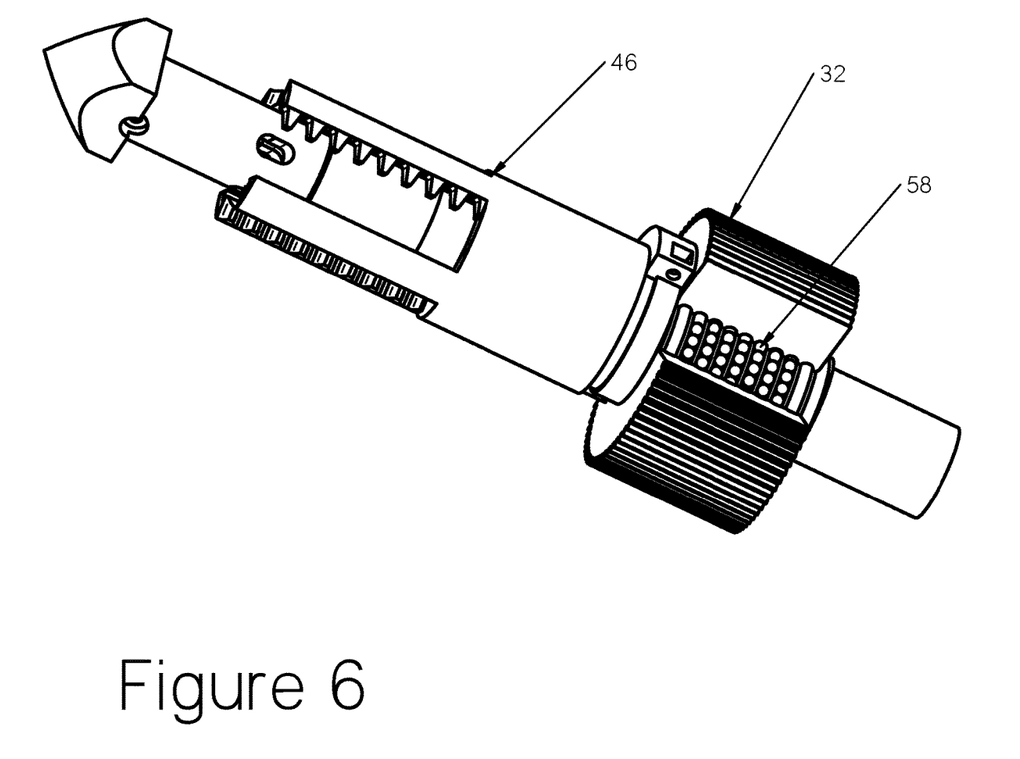
FIG. 6. is a perspective view with a cut-away of the axial modulator (32) exposing the ball-screw arrangement (58).
Figure 7:
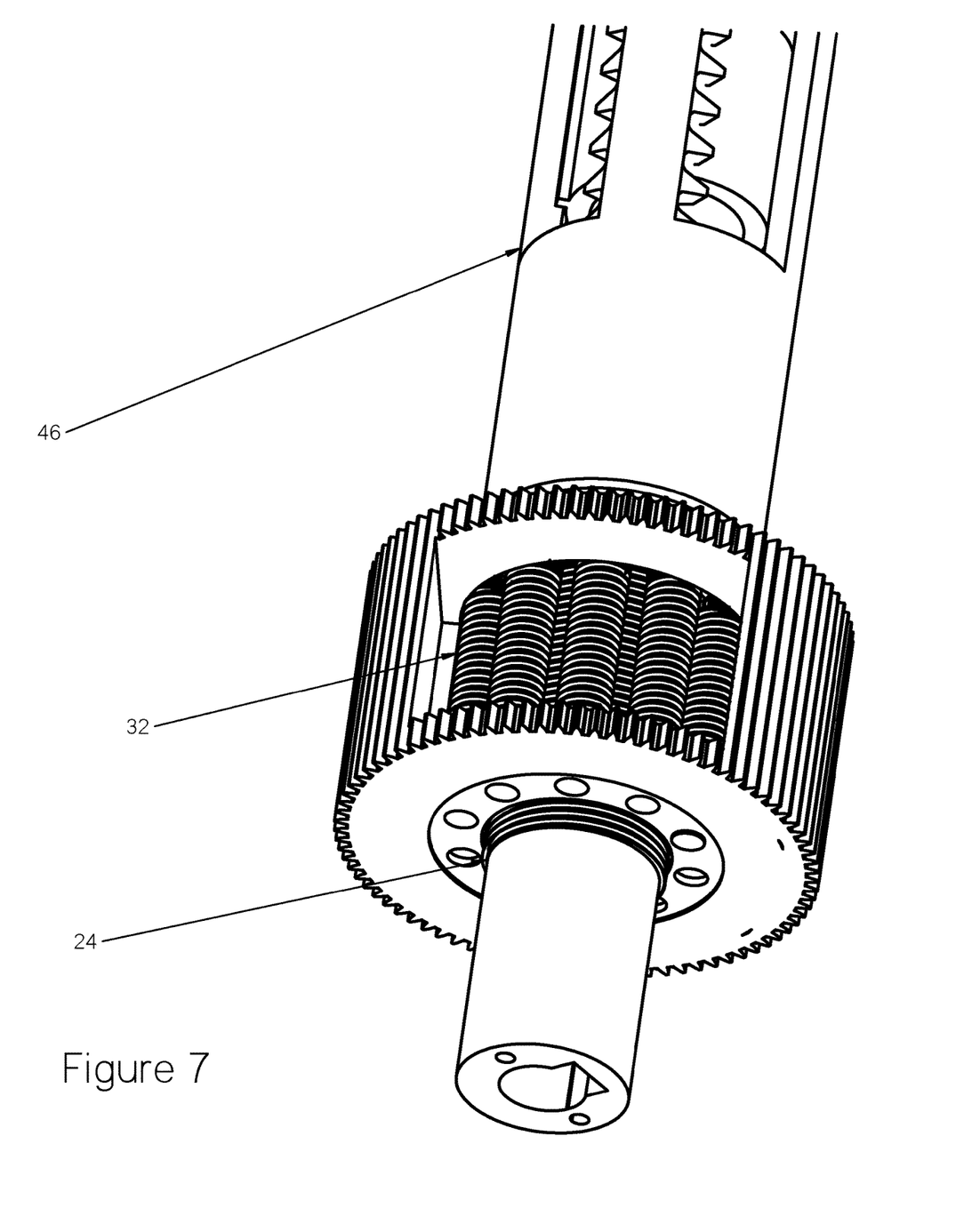
FIG. 7 is a perspective view with a cut-away of the axial modulator (32) exposing the roller-screw arrangement (59).
Figures 8A, 8B:
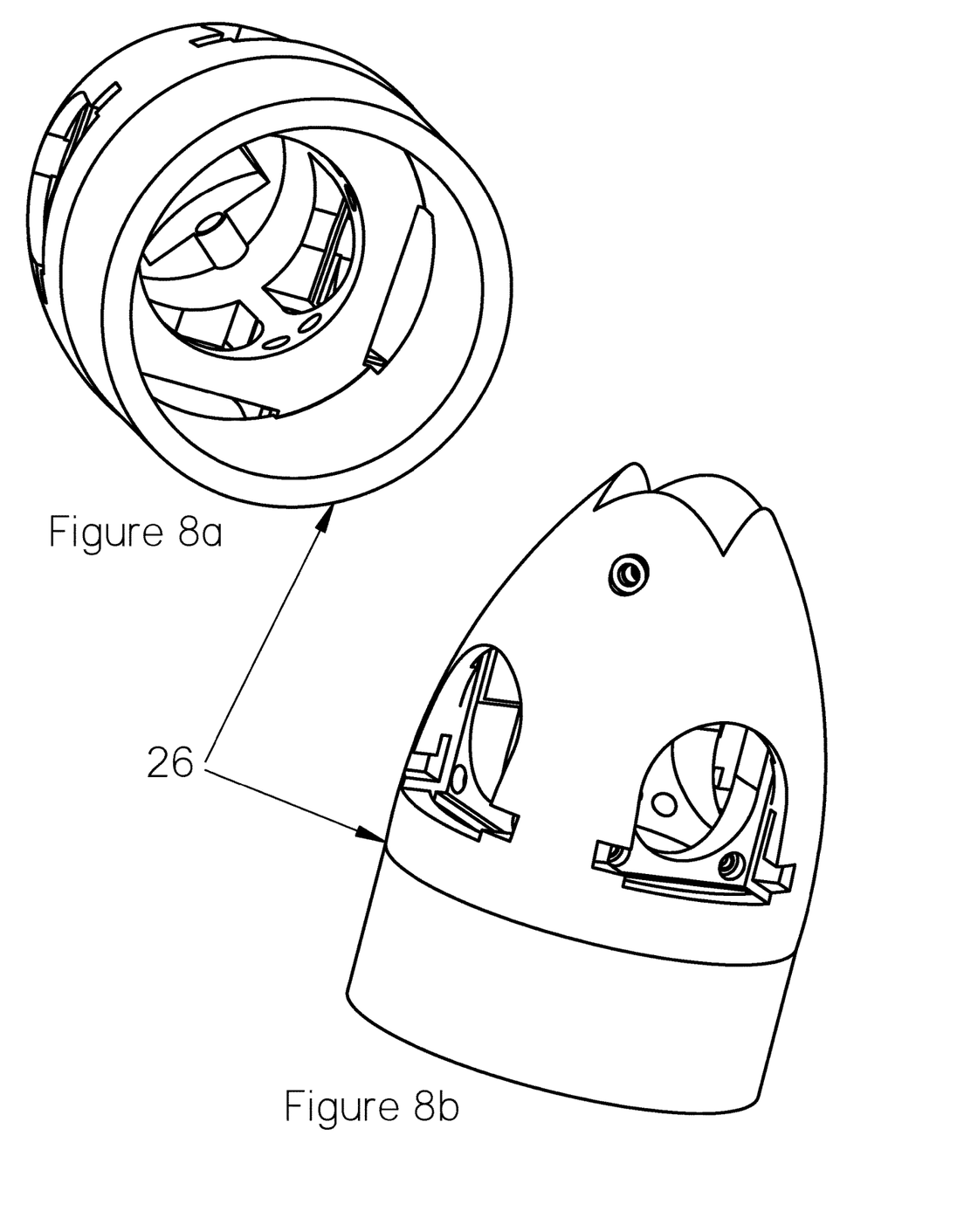

FIG. 5 demonstrates that the axial modulator (32) is rotatably connected to a pitch manipulator (46) which has cylindrical shape and configuration allowing it to mount rotatably within the axial modulator (32) while remaining coupled with the axial modulator's (32) axial motion. The pitch manipulator (46) has a cylindrical cavity, coaxial with its cylindrical exterior, with a diameter large enough for it to pass by the rotor thread (24) when the rotating shaft (22) is inserted into the cylindrical cavity of the pitch manipulator (46). The pitch manipulator (46) has a plurality of pitch-manipulating voids (57) through which a blade pitch manipulator (54) may pass when each of the blade pitch manipulators (54) are inserted into one of the pitch-manipulating voids (57) when the controllable-pitch blades (28) are rotatably mounted within the blade hub (26) and the pitch manipulator (46) is inserted into the blade hub (26).

The base of each controllable-pitch blades (28) has a blade pitch manipulator (54) protruding from it towards the interior of the blade hub (26) when the controllable-pitch blades (28) are rotatably mounted within the blade hub (26). The blade pitch manipulator (54) has a spur-gear profile configured to interact with a plurality of pitch-manipulator rack(s) (47) affixed on the pitch manipulator (46) within the pitch-manipulating void (57). Each pitch-manipulator rack (47) is constituted of a linear gear profile capable of mating with the spur-gear profile of the blade pitch manipulator (54) when the blade pitch manipulator (54) is inserted radially into each of the pitch-manipulating voids (57).

Each pitch-manipulating void (57) and respective pitch-manipulator rack (47) has a distribution about the pitch manipulator's (46) exterior cylindrical circumference, depth, width and profile along the altitude of the pitch manipulator's (46) cylindrical exterior configured in order to force the controllable-pitch blades (28) to rotate when the controllable-pitch blades (28) are rotatably mounted within the blade hub (26), when each controllable-pitch blade's (28) blade pitch manipulator (54) is inserted into its respective pitch-manipulating void (57), and when the pitch manipulator (46) is forced in and out of said blade hub (26). The pitch manipulator (46) is inserted into the blade hub (26)

such that the blade pitch manipulators (54) of each controllable-pitch blade (28) are inserted into the pitch manipulator's (46) respective pitch-manipulating void (57).

The rotating shaft (22) is inserted into the cylindrical cavity of said pitch manipulator (46) and the pitch manipulator (46) is rotatably mounted into said axial modulator (32) while having axial motion rigidly tied with that of the axial modulator (32).

The pitch of each controllable-pitch blade (28) is modulated by varying the axial position of the axial modulator (32) by manipulating the speed of the axial-modulating pinion (39).

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An apparatus for an axial modulating mechanism for rotating shafts including:
   a stator system,
   a rotor system being rotatably mounted in said stator system,
   a rotor thread consisting of a helical groove being affixed on a surface of said rotor system, and
   an axial modulator having a helical groove being capable of mating threadedly to said rotor thread, wherein:
      said axial modulator threadedly mated to said rotor thread, and
      an axial modulating mechanism is affixed to said stator system and is constituted in order to communicate a torque to said axial modulator, even in the presence of rotation in said rotor system, in order to cause said axial modulator to rotate relative to said rotor system to cause said axial modulator to undergo axial displacement along said rotor system.

2. An apparatus as set forth in claim 1, wherein the threaded interaction between said rotor thread and said axial modulator includes a ball-screw arrangement.

3. An apparatus as set forth in claim 1, wherein the threaded interaction between said rotor thread and said axial modulator includes a roller-screw arrangement.

4. An apparatus as set forth in claim 1 wherein:
   said axial modulator has a cylindrical cavity wherein said helical groove of said axial modulator is inscribed,
   said axial modulator has a cylindrical exterior, being concentric with said cylindrical cavity of said axial modulator, said cylindrical exterior comprising a spur-gear profile,
   said axial modulating mechanism has an axial-modulating pinion formed by a pinion gear having a spur-gear profile configured to mesh with said spur-gear profile of said axial modulator,
   said axial modulating mechanism has an axial-modulating prime mover being rigidly connected to said axial-modulating pinion configured to impart a torque on said axial-modulating pinion in order to cause said axial-modulating pinion to rotate,
   said axial modulating mechanism juxtaposed to said axial modulator in order to allow said spur-gear profile of said axial-modulating pinion to mesh rotatably with said spur-gear profile of said axial modulator,
   said axial-modulating pinion has a height sufficient to allow said axial-modulating pinion to remain in mesh with said axial modulator while said axial modulator moves backwards and forwards axially as said axial modulator is threadedly constrained within said rotor thread,
   said axial modulator has a tangential rotational speed measured on a circle, concentric with said axial modulator, where said spur-gear profile of said axial modulator meshes with said spur-gear profile of said axial-modulating pinion, and
   said axial-modulating pinion has a tangential rotational speed measured on a circle, concentric with said axial-modulating pinion, where said spur-gear profile of said axial-modulating pinion meshes with said spur-gear profile of said axial modulator.

5. A method of using the apparatus of claim 4 to control the axial displacement of said axial modulator, comprising:
   manipulating the tangential speed of the axial-modulating pinion to position said axial modulator at the desired axial position along said rotor system in which said axial modulator is threadedly mated.

6. A method of using the apparatus of claim 4 to control said axial displacement of said axial modulator, the method comprising:
   controlling the torque applied by said axial-modulating prime mover on said axial-modulating pinion in order to modulate the tangential speed of said axial-modulating pinion.

7. A method as set forth in claim 6, further comprising:
   causing the tangential rotational speed of said axial-modulating pinion to be equal in magnitude but opposite in direction to the tangential speed of said axial modulator in order to cause said axial modulator to be axially stationary to the rotor system in which it is threadedly mated.

8. The method as set forth in claim 6, further comprising:
   causing the tangential rotational speed of said axial-modulating pinion to be greater in magnitude and opposite in direction to the tangential speed of said axial modulator in order to cause said axial modulator to accelerate axially along the rotor system in which it is threadedly mated.

9. The method as set forth in claim 6, further comprising:
   causing the tangential rotational speed of said axial-modulating pinion to be lesser in magnitude and opposite in direction to the tangential speed of said axial modulator in order to cause said axial modulator to accelerate axially along the rotor system in which it is threadedly mated.

10. An apparatus to manipulate controllable-pitch blades including:
    a stator,
    a rotating shaft being rotatably mounted in the stator system,
    a prime mover being rigidly connected with said rotating shaft and configured to impart a torque upon said rotating shaft to cause said rotating shaft to rotate, a rotor thread consisting of a helical groove affixed on the exterior surface of said rotating shaft, a blade hub being affixed to said rotating shaft, and a plurality of blades being affixed to said blade hub and being formed to cause said blades to transfer mechanical energy between said rotating shaft and a fluid in which one or more of said blades are immersed, wherein:

one or more of the plurality of blades is a controllable-pitch blade, a rotatable base is positioned at an end of each controllable pitch blade that is closest said blade hub, each said rotatable base is rotatably mounted within said blade hub, an axial modulator having a cylindrical cavity wherein a helical groove is affixed, said helical groove of axial modulator is threadedly mated to said rotor thread, said blade hub having a cavity of sufficient diameter to allow said axial modulator to move backwards and forwards within said hub, said rotor thread is disposed on said rotating shaft to allow said axial modulator to pass within said cavity of said blade hub, and said movement of said axial modulator through said cavity of said blade hub causes said controllable-pitch blades to rotate within said hub.

11. An apparatus to manipulate controllable-pitch blades set forth in claim 10, wherein:

said axial modulator has a cylindrical exterior, being concentric with said cylindrical cavity of said axial modulator, said cylindrical exterior comprising a spur-gear profile, said axial modulating mechanism has an axial-modulating pinion formed by a pinion gear having a spur-gear profile with said spur-gear profile of said axial modulator, said axial modulating mechanism has an axial-modulating prime mover being rigidly connected to said axial-modulating pinion and configured to impart a torque on said axial-modulating pinion in order to cause said axial-modulating pinion to rotate, said axial modulating mechanism is juxtaposed to said axial modulator in order to allow said spur-gear profile of said axial-modulating pinion to mesh rotatably with said spur-gear profile of said axial modulator, and said axial-modulating pinion has a height sufficient to allow said axial-modulating pinion to remain in mesh with said axial modulator while said axial modulator moves backwards and forwards axially as said axial modulator is threadedly constrained within said rotor thread.

12. An apparatus to manipulate controllable-pitch blades set forth in claim 11, further comprising:

a pitch manipulator having a cylindrical shape and configured to mount rotatably with said axial modulator but remain coupled with said axial modulator thereby axially moving with said axial modulator, wherein said pitch manipulator has a cylindrical cavity, being coaxial with said pitch manipulator's cylindrical exterior, said cylindrical cavity having a diameter large enough for said pitch manipulator to pass by said rotor thread when said rotating shaft is inserted into said cylindrical cavity of said pitch manipulator, a blade pitch manipulator protrudes from the rotatable base of each of said controllable-pitch blades towards the interior of said blade hub when said controllable-pitch blades are rotatably mounted within said blade hub, wherein:

said each said blade pitch manipulator has a spur-gear profile, and said pitch manipulator has a plurality of pitch-manipulating voids through which each one of said blade pitch manipulators, respectively, a plurality of pitch-manipulator racks are affixed on said pitch manipulator wherein each pitch manipulator is mounted within said pitch-manipulating voids, respectively, wherein, each said pitch-manipulator rack is constituted of a linear gear profile capable of mating with said spur-gear profile of said blade pitch manipulator when said blade pitch manipulator is inserted radially into each of said pitch-manipulating void, said pitch-manipulating voids and respective pitch-manipulator racks are distributed about said pitch manipulator's exterior cylindrical circumference, depth, width and a profile along the altitude of said pitch manipulator's cylindrical exterior configured to force said controllable-pitch blades to rotate when said pitch manipulator axially moves, wherein, said rotating shaft is inserted into said cylindrical cavity of said pitch manipulator, said pitch manipulator is inserted into said blade hub such that the blade pitch manipulators of each said controllable-pitch blades are inserted into said pitch manipulator's respective pitch-manipulating void, said pitch manipulator is rotatably mounted into said axial modulator and has axial motion rigidly tied with that of said axial modulator, and whereby modulating the axial position of said axial modulator by manipulating the speed of said axial-modulating pinion controls the pitch of said controllable pitch blades.

* * * * *